(12) United States Patent
Kim et al.

(10) Patent No.: US 11,330,951 B2
(45) Date of Patent: May 17, 2022

(54) ROBOT CLEANER AND METHOD OF OPERATING THE SAME

(71) Applicant: LG ELECTRONICS INC., Seoul (KR)

(72) Inventors: Kokeun Kim, Seoul (KR); Suyeon Kim, Seoul (KR); Kamin Lee, Seoul (KR); Seungah Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 216 days.

(21) Appl. No.: 16/708,233

(22) Filed: Dec. 9, 2019

(65) Prior Publication Data
US 2021/0121035 A1    Apr. 29, 2021

(30) Foreign Application Priority Data
Oct. 29, 2019 (KR) .................. 10-2019-0135735

(51) Int. Cl.
| | | |
|---|---|---|
| A47L 11/00 | (2006.01) | |
| A47L 11/40 | (2006.01) | |
| B25J 9/00 | (2006.01) | |
| G05D 1/02 | (2020.01) | |
| H04B 17/318 | (2015.01) | |

(52) U.S. Cl.
CPC ......... *A47L 11/4011* (2013.01); *B25J 9/0003* (2013.01); *G05D 1/0217* (2013.01); *G05D 1/0219* (2013.01); *G05D 1/0221* (2013.01); *H04B 17/318* (2015.01); *A47L 2201/04* (2013.01); *G05D 2201/0215* (2013.01)

(58) Field of Classification Search
CPC .. A47L 11/4011; B25J 9/0003; H04B 17/318; G06N 20/00; G05D 1/0219; G05D 1/0217; G05D 1/0221
USPC .................. 700/245, 253, 255, 258; 15/319; 134/18; 701/2, 23, 25
See application file for complete search history.

(56) References Cited

U.S. PATENT DOCUMENTS

| | | | |
|---|---|---|---|
| 2019/0212752 A1* | 7/2019 | Fong | G06K 9/00 |
| 2020/0331148 A1* | 10/2020 | Zhang | G05D 1/0246 |
| 2021/0085146 A1* | 3/2021 | Cho | G05D 1/0044 |
| 2021/0131822 A1* | 5/2021 | Artes | G05D 1/0225 |
| 2021/0213619 A1* | 7/2021 | Hong | A47L 9/2857 |

* cited by examiner

*Primary Examiner* — Dalena Tran
(74) *Attorney, Agent, or Firm* — Lee Hong Degerman Kang & Waimey

(57) ABSTRACT

Disclosed herein is a robot cleaner including a driving motor, a communication interface configured to receive, from an external cleaner, first cleaning record information including cleaning path information generated based on location information of the external cleaner, a memory configured to store second cleaning record information including the cleaning path information generated based on location information of the robot cleaner, and a processor configured to generate a cleaning plan of the robot cleaner based on the first cleaning record information and the second cleaning record information and control the driving motor such that the driving motor travels according to the cleaning plan.

18 Claims, 14 Drawing Sheets

ROBOT CLEANER AND METHOD OF OPERATING THE SAME

CROSS-REFERENCE TO RELATED APPLICATIONS

Pursuant to 35 U.S.C. § 119(a), this application claims the benefit of earlier filing date and right of priority to Korean Patent Application No. 10-2019-0135735, filed on Oct. 29, 2019, the contents of which are hereby incorporated by reference herein in its entirety.

BACKGROUND OF THE INVENTION

1. Field of the Invention

The present disclosure relates to a robot cleaner using artificial intelligence.

2. Discussion of the Related Art

Artificial intelligence (AI) refers to one field of computer engineering and information technology of studying a method for making a computer think, learn, and do self-improvement, which is achieved based on human intelligence, and means that a computer emulates an intelligent behavior of the human.

AI is largely related directly and indirectly to other fields of a computer science rather than existing itself. In particular, AI elements have been modernly introduced in various fields of information technology, and there has been an active attempt to use AI to overcome problems of the fields.

Research has been actively conducted into technology of recognizing and learning a surrounding situation using AI and providing information desired by a user in the desired form or performing an operation or function desired by the user.

An electronic device for providing such various operations and functions is referred to as an AI device.

On the other hand, the use of a plurality of cleaners for cleaning in buildings is increasing.

In this case, there is a problem in that the cleaning area of the robot cleaner which the user operates and the cleaning area of the robot cleaner can travel by itself overlaps, leading to inefficient cleaning.

In addition, a cleaning method of the user and a cleaning method of the robot cleaner are different, there is a problem that the use satisfaction of the robot cleaner is lowered.

Therefore, the necessity of a robot cleaner which performs cleaning using cleaning information of an external cleaner is increasing.

SUMMARY OF THE INVENTION

The present disclosure aims to solve the above and other problems.

An object of the present disclosure is to provide a robot cleaner, in which a cleaner operated by a user and a robot cleaner that runs by itself share information about cleaning areas with each other to efficiently perform cleaning.

An object of the present disclosure is to provide a robot cleaner for training a neural network model capable of determining a location of a cleaner using information about a strength of a communication signal of an external device.

An object of the present disclosure is to provide a robot cleaner capable of performing cleaning by generating a cleaning plan based on cleaning record information of an external cleaner.

An object of the present disclosure is to provide a robot cleaner capable of transmitting cleaning record information of a robot cleaner to an external cleaner to enable a user to efficiently perform cleaning using an external cleaner.

According to an embodiment of the present disclosure, a robot cleaner includes a driving motor, a communication interface configured to receive, from an external cleaner, first cleaning record information including cleaning path information generated based on location information of the external cleaner, a memory configured to store second cleaning record information including the cleaning path information generated based on location information of the robot cleaner, and a processor configured to generate a cleaning plan of the robot cleaner based on the first cleaning record information and the second cleaning record information and control the driving motor such that the driving motor travels according to the cleaning plan.

Furthermore, according to an embodiment of the present disclosure, a robot cleaner includes a processor configured to measure a communication signal strength for each of at least one or more external devices and obtain location information on a SLAM map for an operation space of the robot cleaner, and a learning processor configured to train a location determination model for outputting predetermined location information when a predetermined communication signal strength is input based on training data labeled with the location information on the SLAM map with respect to the communication signal strength.

According to an embodiment of the present disclosure, a cleaning method includes receiving, from an external cleaner, first cleaning record information including cleaning path information generated based on location information of the external cleaner, storing second cleaning record information including cleaning path information generated based on location information of the robot cleaner, generating a cleaning plan of the robot cleaner based on the first cleaning record information and the second cleaning record information, and controlling the driving motor such that the driving motor travels according to the cleaning plan. Furthermore, a cleaning method includes measuring a communication signal strength for each of at least one or more external devices, obtaining location information on an SLAM map for an operation space of the robot cleaner, and training a location determination model for outputting predetermined location information when a predetermined communication signal strength is input based on training data labeled with the location information on the SLAM map with respect to the communication signal strength.

DETAILED DESCRIPTION OF THE PREFERRED EMBODIMENTS

Figure 1:
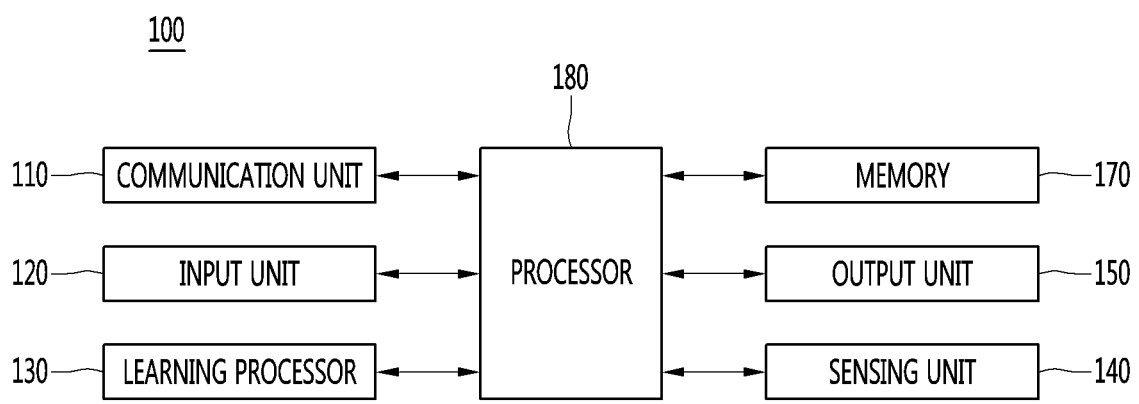
FIG. 1 illustrates an AI device according to an embodiment of the present disclosure.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI device 100 according to an embodiment of the present disclosure.

The AI device (or an AI apparatus) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
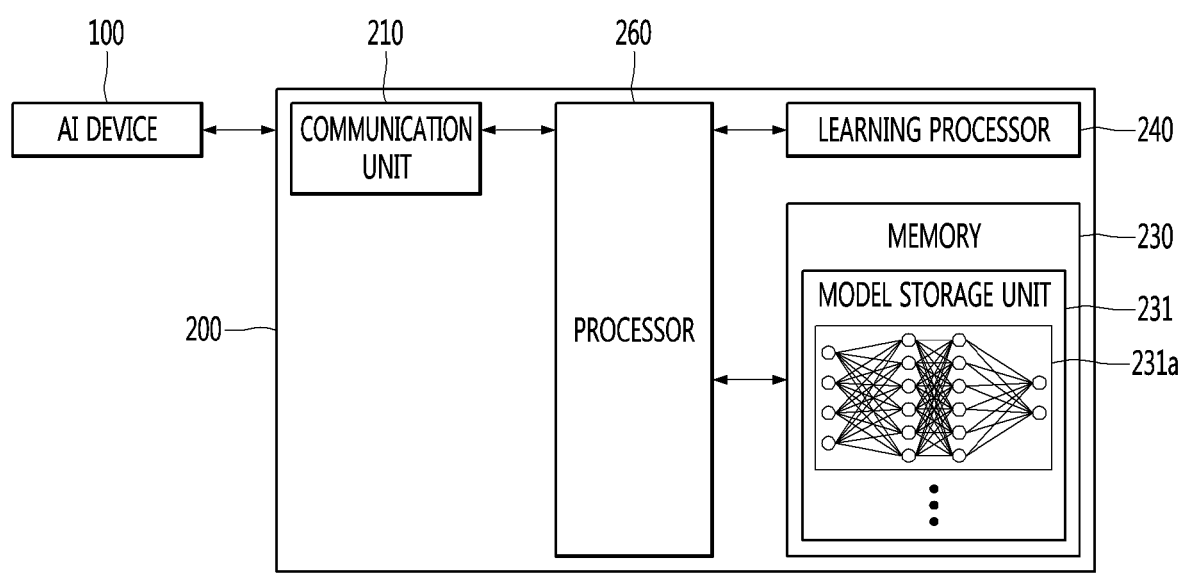
FIG. 2 illustrates an AI server according to an embodiment of the present disclosure.

FIG. 2 illustrates an AI server 200 according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231*a*) through the learning processor 240.

The learning processor 240 may learn the artificial neural network 231*a* by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
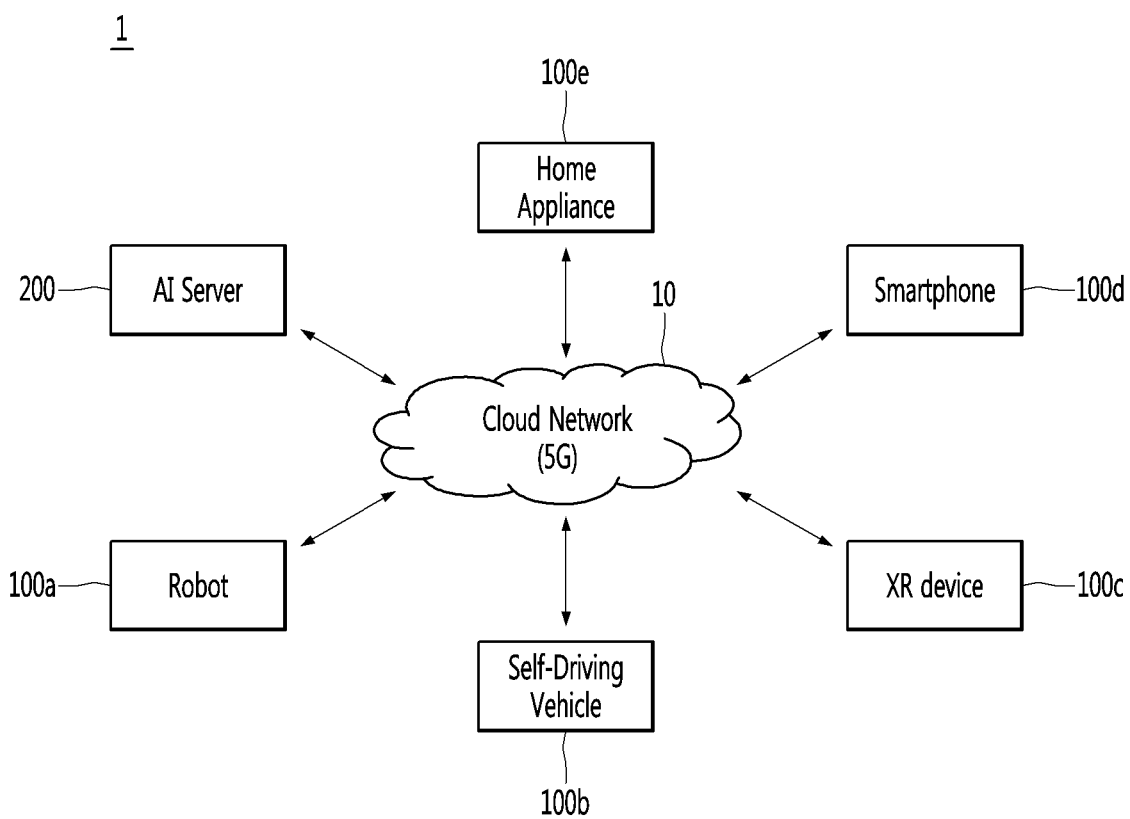
FIG. 3 illustrates an AI system according to an embodiment of the present disclosure.

FIG. 3 illustrates an AI system 1 according to an embodiment of the present disclosure.

Referring to FIG. 3, in the AI system 1, at least one of an AI server 200, a robot 100*a*, a self-driving vehicle 100*b*, an XR device 100*c*, a smartphone 100*d*, or a home appliance 100*e* is connected to a cloud network 10. The robot 100*a*, the self-driving vehicle 100*b*, the XR device 100*c*, the smartphone 100*d*, or the home appliance 100*e*, to which the AI technology is applied, may be referred to as AI devices 100*a* to 100*e*.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100*a* to 100*e* and 200 configuring the AI system 1 may be connected to each other through the cloud network 10. In particular, each of the devices 100*a* to 100*e* and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100*a*, the self-driving vehicle 100*b*, the XR device 100*c*, the smartphone 100*d*, or the home appliance 100*e* through the cloud network 10, and may assist at least part of AI processing of the connected AI devices 100*a* to 100*e*.

At this time, the AI server 200 may learn the artificial neural network according to the machine learning algorithm instead of the AI devices 100*a* to 100*e*, and may directly store the learning model or transmit the learning model to the AI devices 100*a* to 100*e*.

At this time, the AI server 200 may receive input data from the AI devices 100*a* to 100*e*, may infer the result value for the received input data by using the learning model, may generate a response or a control command based on the inferred result value, and may transmit the response or the control command to the AI devices 100*a* to 100*e*.

Alternatively, the AI devices 100*a* to 100*e* may infer the result value for the input data by directly using the learning model, and may generate the response or the control command based on the inference result.

Hereinafter, various embodiments of the AI devices 100*a* to 100*e* to which the above-described technology is applied will be described. The AI devices 100*a* to 100*e* illustrated in FIG. 3 may be regarded as a specific embodiment of the AI device 100 illustrated in FIG. 1.

<AI+Robot>

The robot 100*a*, to which the AI technology is applied, may be implemented as a guide robot, a carrying robot, a cleaning robot, a wearable robot, an entertainment robot, a pet robot, an unmanned flying robot, or the like.

The robot 100*a* may include a robot control module for controlling the operation, and the robot control module may refer to a software module or a chip implementing the software module by hardware.

The robot 100*a* may acquire state information about the robot 100*a* by using sensor information acquired from various kinds of sensors, may detect (recognize) surrounding environment and objects, may generate map data, may determine the route and the travel plan, may determine the response to user interaction, or may determine the operation.

The robot 100*a* may use the sensor information acquired from at least one sensor among the lidar, the radar, and the camera so as to determine the travel route and the travel plan.

The robot 100*a* may perform the above-described operations by using the learning model composed of at least one artificial neural network. For example, the robot 100*a* may recognize the surrounding environment and the objects by using the learning model, and may determine the operation by using the recognized surrounding information or object information. The learning model may be learned directly from the robot 100*a* or may be learned from an external device such as the AI server 200.

At this time, the robot 100*a* may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling movement line by using the recognized surrounding information or object information. The learning model may be learned directly from the self-driving vehicle 100a or may be learned from an external device such as the AI server 200.

At this time, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external apparatus to determine the travel route and the travel plan, and may control the driving unit such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving unit based on the control/interaction of the user. At this time, the self-driving vehicle 100b may acquire the intention information of the interaction due to the user's operation or speech utterance, and may determine the response based on the acquired intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

At this time, the XR device 100c may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
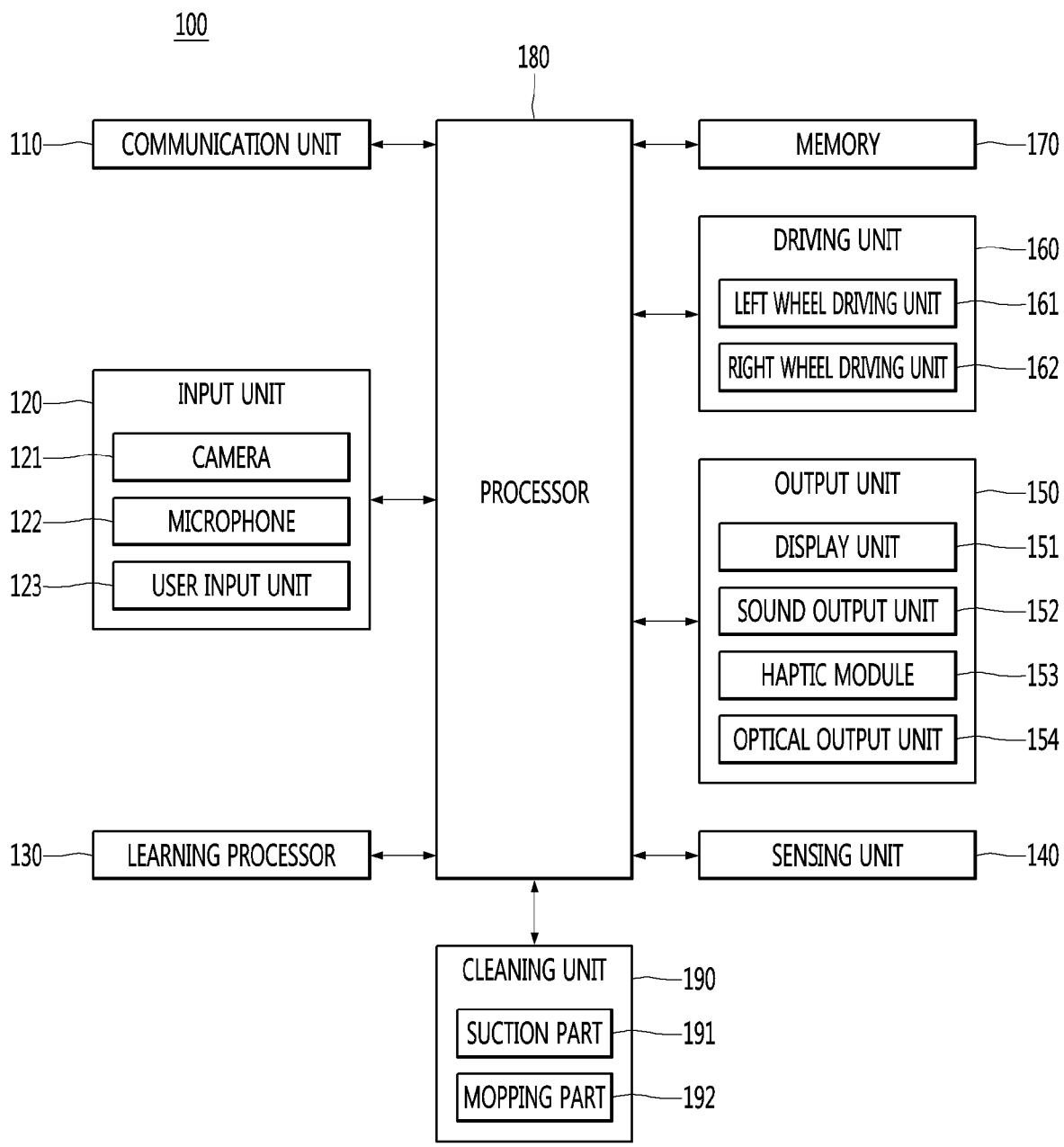
FIG. 4 illustrates a robot cleaner according to an embodiment of the present disclosure.

FIG. 4 illustrates a robot cleaner according to an embodiment of the present disclosure.

A description overlapping that given with reference to FIG. 1 will be omitted.

Referring to FIG. 4, the robot cleaner 100 may further include a driving unit 160 and a cleaning unit 193.

The input unit 120 may include a camera 121 for inputting an image signal, a microphone 122 for receiving an audio signal, and a user input unit 123 for receiving information from a user.

The speech data or image data collected by the input unit 120 may be analyzed and processed as a control command of the user.

The input unit 120 is for inputting image information (or signal), audio information (or signal), data, or information input from a user. In order to input image information, the robot cleaner 100 may include one or a plurality of cameras 121.

The camera 121 processes image frames such as still images or moving images obtained by an image sensor in a video call mode or a photographing mode. The processed image frames may be displayed on the display unit 151 or stored in the memory 170.

The microphone 122 processes external sound signals as electrical speech data. The processed speech data may be utilized in various ways according to a function (or a running application program) being performed in the robot cleaner 100. Meanwhile, various noise reduction algorithms may be applied in the microphone 122 to remove noise occurring in the process of receiving an external sound signal.

The user input unit 123 is for receiving information from a user. When information is input through the user input unit 123, the processor 180 may control the operation of the robot cleaner 100 to correspond to the input information when the information is inputted through the user input unit 123.

The user input unit 123 may include mechanical input means (or a mechanical key, for example, a button, a dome switch, a jog wheel, or a jog switch located at the front/rear or side of the robot cleaner 100) and touch input means. As an example, the touch input means may include a virtual key, a soft key, or a visual key displayed on the touch screen through software processing, or a touch key disposed in the other portion than the touch screen.

The sensing unit 140 may be referred to as a sensor unit.

The sensing unit 140 may include one or more of a depth sensor (not shown), an RGB sensor (not shown), a collision detection sensor (not shown), and a cliff sensor (not shown), and may obtain image data for surroundings of the robot cleaner 100.

The depth sensor may detect that light emitted from a light emitting unit (not shown) is reflected by the object and returned. The depth sensor may measure a distance to an object based on a time difference obtained by detecting a returned light and the amount of the returned light, or the like.

The depth sensor may obtain 2D image information or 3D image information related to the surroundings of the robot cleaner 100 based on the measured distance to the object.

The RGB sensor may obtain color image information for an object or a user around the robot cleaner 100. The color image information may be a captured image of an object. The RGB sensor may be referred to as an RGB camera.

In this case, the camera 121 may mean an RGB sensor.

The collision detection sensor may be referred to as a bumper sensor and may measure an impact amount.

The cliff sensor may measure a distance to a floor surface of the artificial intelligence device 100.

In this case, the cliff sensor may be implemented with an optical sensor or a depth sensor.

The sensor information obtained by the sensing unit 140 may be used to detect an object or an obstacle.

The output unit 150 may include at least one of a display unit 151, a sound output unit 152, a haptic module 153, and an optical output unit 154.

The display unit 151 displays (outputs) information processed by the robot cleaner 100. For example, the display unit 151 may display execution screen information of an application program running on the robot cleaner 100, or UI (User Interface) or Graphic User Interface (GUI) information according to the execution screen information.

The display unit 151 may implement a touch screen in such a manner that the display unit 151 forms a layer structure with or is integrally formed with a touch sensor. The touch screen may function as the user input unit 720 that provides an input interface between the robot cleaner 100 and the user and may provide an output interface between the robot cleaner 100 and the user.

The sound output unit 152 may output audio data received from the communication unit 110 or stored in the memory 170 in call signal reception, a call mode or a recording mode, a speech recognition mode, a broadcast reception mode, or the like.

The sound output unit 152 may include at least one of a receiver, a speaker, and a buzzer.

The haptic module 153 generates various tactile effects that a user is able to feel. A representative example of the tactile effect generated by the haptic module 153 may be vibration.

The optical output unit 154 outputs a signal for notifying occurrence of an event by using light of a light source of the robot cleaner 100. Examples of events generated by the robot cleaner 100 may include message reception, call signal reception, a missed call, an alarm, schedule notification, email reception, and information reception through an application, and the like.

The driving unit 160 may move the robot cleaner 100 in a specific direction or by a specific distance.

The driving unit 170 may include a left wheel driving unit 171 for driving the left wheel of the robot cleaner 100 and a right wheel driving unit 173 for driving the right wheel.

The left wheel driver 161 may include a motor for driving the left wheel, and the right wheel driver 162 may include a motor for driving the right wheel. The motor for driving the left wheel or the right wheel may be referred to as a driving motor.

Although the driving unit 160 is illustrated as including the left wheel driving unit 161 and the right wheel driving unit 162 as an example in FIG. 4, the present disclosure is not limited thereto. That is, in one embodiment, the driving unit 160 may be composed of only one wheel.

The cleaning unit 190 may include at least one of a suction part 191 or a mopping part 192 to clean the floor near the robot cleaner 100.

The suction part 191 may be referred to as a vacuum cleaning unit.

The suction part 191 may suck foreign substances such as dust or garbage around the robot cleaner 100 by sucking air.

In this case, the suction part 191 may include a brush or the like as means for collecting the foreign substances.

The mopping part 192 may wipe the floor in a state in which a mop is in contact with at least a part of the bottom surface of the robot cleaner 100.

In this case, the mopping part 192 may include a mop, a mop driving unit for moving the mop, and the like.

The distance of the mop of the mopping part 192 from the ground may be adjusted through a mop driving unit. That is, the mop driving unit may be operated such that the mop is in contact with the ground when mopping is necessary.

Figure 5:
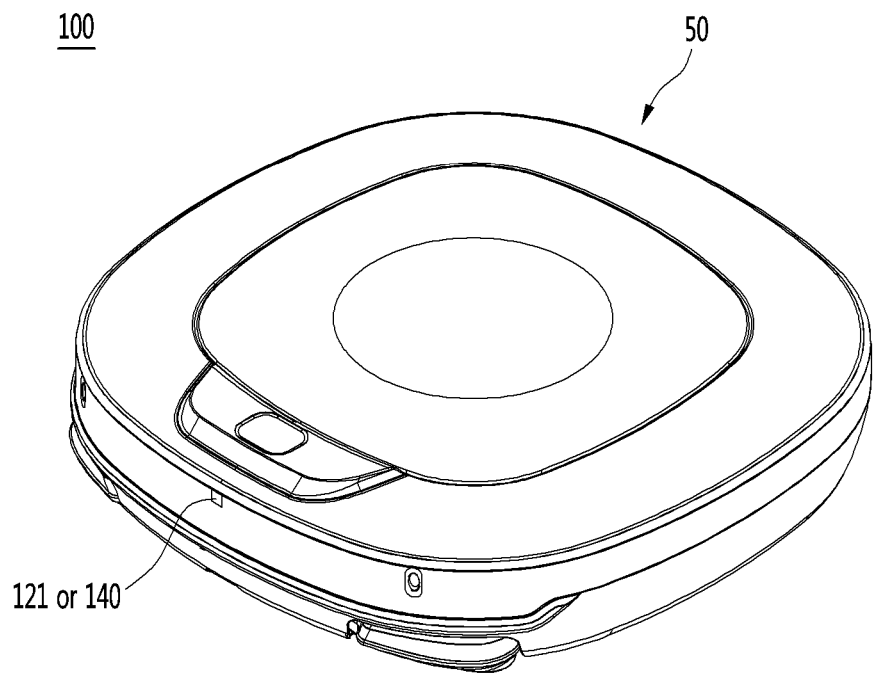
FIG. 5 is a perspective view of a robot cleaner according to an embodiment of present disclosure.

FIG. 5 is a perspective view of a robot cleaner according to an embodiment of present disclosure.

Referring to FIG. 5, the robot cleaner 100 may include a cleaner body 50, a camera 121, or a sensing unit 140.

The camera 121 or the sensing unit 140 may project light toward the front and receive a reflected light.

The camera 121 or the sensing unit 140 may obtain depth information by using a time difference between projected light and returned light.

The cleaner body 50 may include other components except for the camera 121 and the sensing unit 140 among the components described with reference to FIG. 4.

Figure 6:
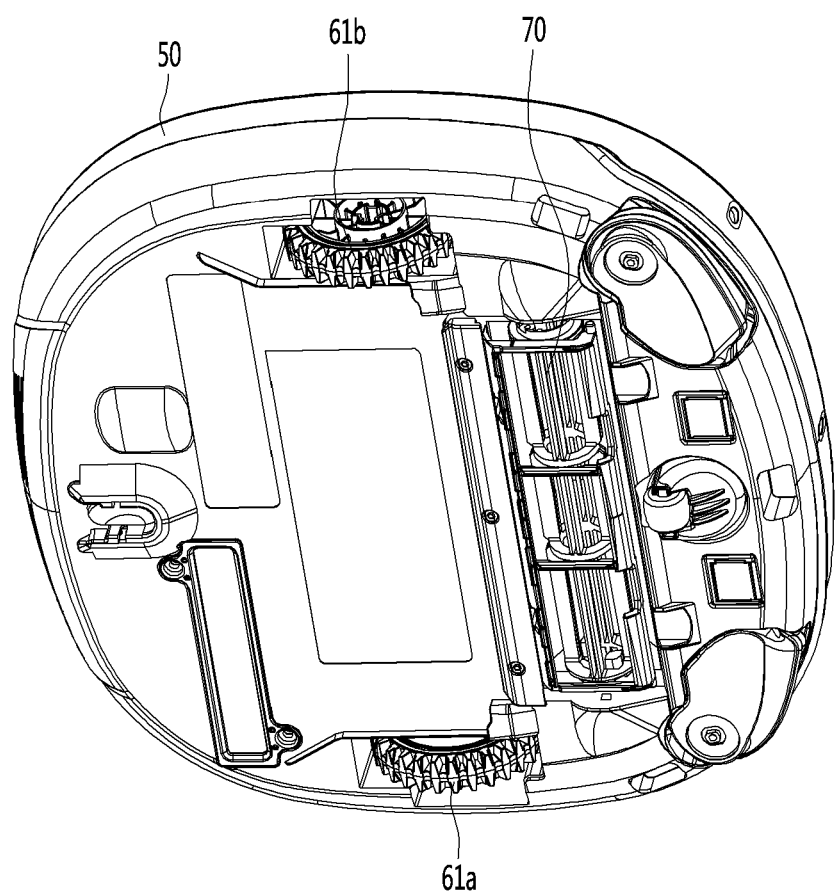
FIG. 6 is a bottom view of the robot cleaner according to an embodiment of the present disclosure.

FIG. 6 is a bottom view of the robot cleaner according to an embodiment of the present disclosure.

Referring to FIG. 6, in addition to the configuration of FIG. 4, the robot cleaner 100 may further include a cleaner body 50, a left wheel 61a, a right wheel 61b, and a suction unit 70.

The left wheel 61a and the right wheel 61b may drive the cleaner body 50.

A left wheel driving unit 161 may drive the left wheel 61a, and a right wheel driving unit 162 may drive the right wheel 61b.

As the left wheel 61a and the right wheel 61b are rotated by the driving unit 160, the robot cleaner 100 may suck foreign substances such as dust or garbage through the suction unit 70.

The suction unit 70 may be provided in the cleaner body 50 to suck dust from a floor.

The suction unit 70 may further include a filter (not shown) that collects foreign substances from sucked airflow, and a foreign substance receiver (not shown) in which foreign substances collected by the filter are accumulated.

In addition, the robot cleaner 100 may further include a mopping part (not shown) in addition to the configuration of FIG. 4.

The mopping part (not shown) may include a mop (not shown) and a motor (not shown) that rotates the mop in a state in which the mop is in contact with the floor or moves according to a set pattern. The robot cleaner 100 may wipe the floor through the mopping part (not shown).

Figure 7:
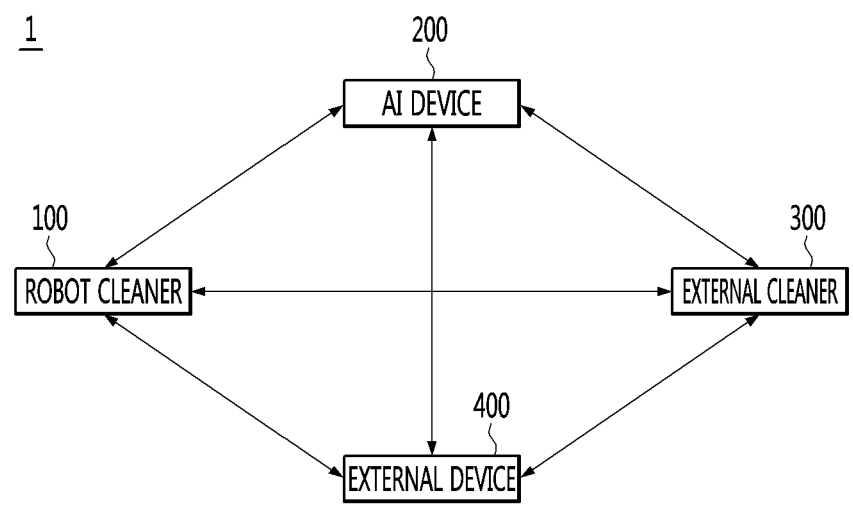
FIG. 7 is a diagram illustrating an example of an artificial intelligence system according to an embodiment of the present disclosure.

FIG. 7 is a diagram illustrating an example of an artificial intelligence system 1 according to an embodiment of the present disclosure.

Referring to FIG. 7, the artificial intelligence system 1 may include the robot cleaner 100, an artificial intelligence (AI) server 200, an external cleaner 300, and an external device 400.

The robot cleaner 100, the AI server 200, the external cleaner 300 and the external device 400 may communicate with one another using wired or wireless communication technology.

In particular, the robot cleaner 100, the AI server 200, the external cleaner 300 and the external device 400 may communicate with one another using wired or wireless communication technology.

In addition, the robot cleaner 100 may store identification information of at least one or more external cleaners 300 and at least one or more external devices 400. The robot cleaner 100 may identify each of the at least one or external cleaners 300 and the at least one or more external devices 400.

The robot cleaner 100 may include a cleaner capable of traveling and moving by itself.

The external cleaner 300 may include a cleaner capable of being moved by a person or an external force.

The external device 400 may include an artificial intelligence robot, an Internet of Thing (IoT) device, a television, an air conditioner, a refrigerator, a washing machine, a home security camera, an air cleaner, home appliance or a TV.

The external cleaner 300 and the robot cleaner 100 may have cleaning areas to be cleaned which overlap each other or are identical to each other. The external device 400 may be a device located in leaning areas of the external cleaner 300 and the robot cleaner 100.

In addition, each of the external cleaners 300 may transmit or receive data to or from the artificial intelligence robot 100 directly or through the AI server 200.

Figure 8:
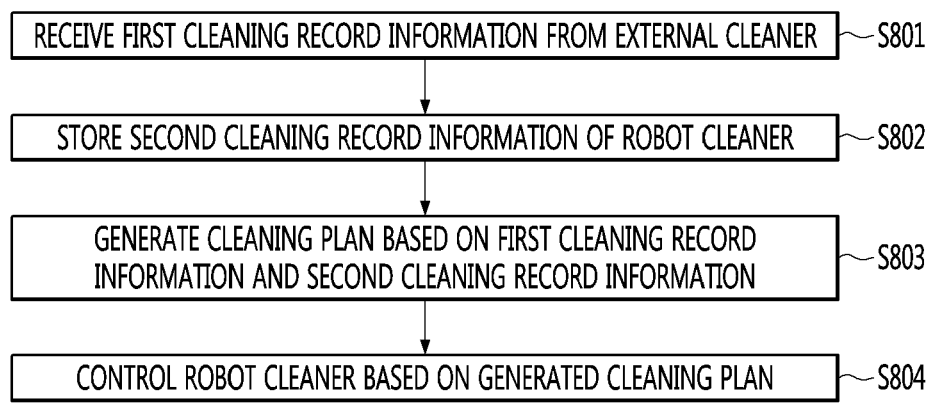
FIG. 8 is a flowchart for describing a method of operating a learning system according to an embodiment of the present disclosure.

FIG. 8 is a flowchart for describing a cleaning method for a robot cleaner according to an embodiment of the present disclosure.

The communication unit 110 may receive first cleaning record information including cleaning path information generated based on location information of the external cleaner 300 from the external cleaner 300 (S801). The communication unit 110 may be referred to as a communication interface.

The location information of the external cleaner 300 may have the same format as the location information on an SLAM map of the robot cleaner 100.

The location information of the external cleaner 300 may be location information output by providing a strength of a communication signal for at least one or more external devices 400 to a location determination model to be described later.

The cleaning path information may be information in which the location of the external cleaner 300 is recorded while power is applied to the external cleaner 300 and the power supply is turned off.

The first cleaning record information may include information about at least one of cleaning date and time, cleaning degree, and cleaning mode of the external cleaner 300.

In addition, the first cleaning record information may include information about a cleaning start date and time and a cleaning end date and time for each cleaning each time the external cleaner 300 performs the cleaning.

In addition, the first cleaning record information may include information about the cleaning degree such as a vacuum suction strength at which the external cleaner 300 sucks dust, the rotation speed of a motor, and the like.

In addition, the first cleaning record information may include information about a cleaning mode of the external cleaner 300. For example, the cleaning mode may be a dust suction mode, a bedding mode and a wet mopping mode. The first cleaning record information may include information about a cleaning mode in which the external cleaner 300 has performed cleaning at a predetermined date and time and at a predetermined location. Meanwhile, the location determination model used by the external cleaner 300 to obtain location information of the external cleaner 300 may be a location determination model received from the robot cleaner 100.

The location determination model may be a location determination model trained based on communication signal strength information for at least one external device 400 and location information on a SLAM map of the robot cleaner 100.

Figure 9:
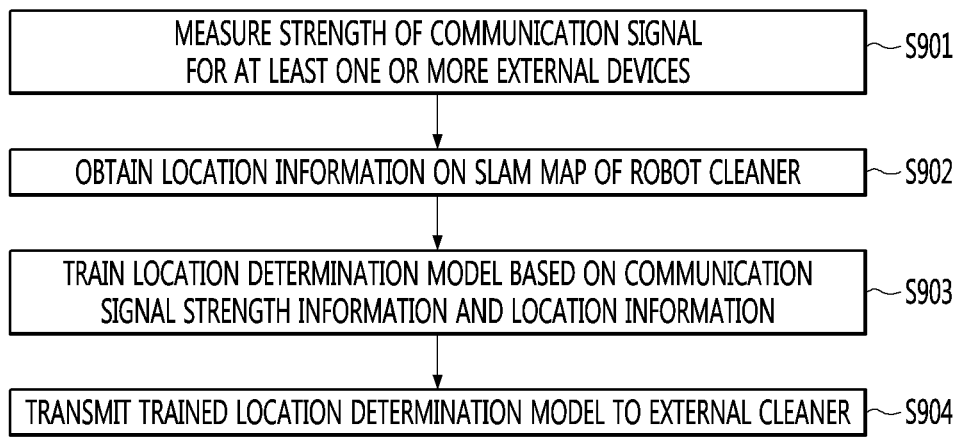
FIG. 9 is a flowchart for describing a method of learning a location determination model according to an embodiment of the present disclosure.

FIG. 9 is a flowchart for describing a method of training a location determination model according to an embodiment of the present disclosure.

The processor 180 may measure a communication signal strength for each of the at least one or more external devices 400 (S901). In this case, the communication signal strength may be the strength of a Wi-Fi communication signal from at least one or more external devices 400.

In addition, the strength of a communication signal of each of the at least one or more external devices 400 may vary depending on a distance to the robot cleaner 100.

The processor 180 may obtain information about the strength of the communication signal measured by the communication unit 110 for each of the one or more external devices 400.

Figure 10:
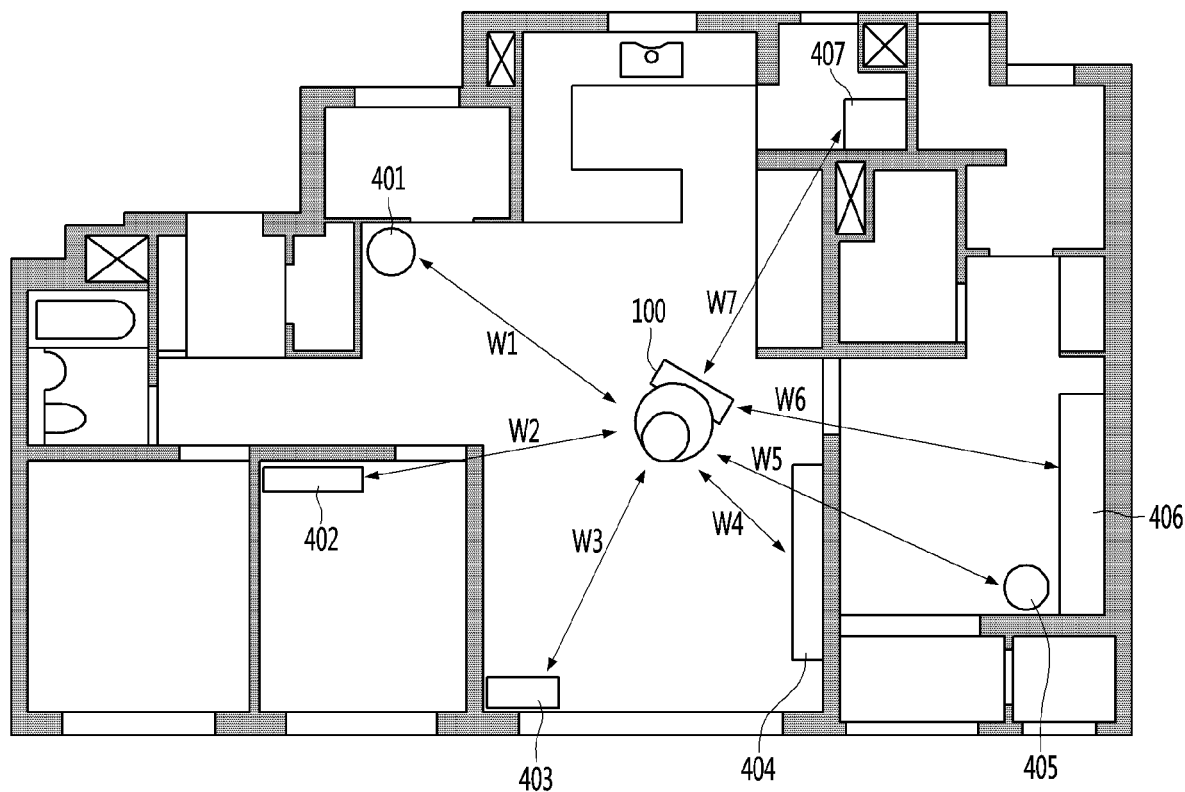
FIGS. 10 and 11 are diagrams for describing a method of learning a location determination model according to an embodiment of the present disclosure.

Referring to FIG. 10, the processor 180 may obtain information about the strengths of communication signals $W_1$, $W_2$, $W_3$, $W_4$, $W_5$, $W_6$ and $W_7$ between the robot cleaner 100 and a first external device 401, a second external device 402, a third external device 403, a fourth external device 404, a fifth external device 405, a sixth external device 406, and a seventh external device 407.

In addition, the processor 180 may obtain location information on an SLAM map of the robot cleaner 100 (S902).

The learning processor 130 may generate training data labeled with location information on the SLAM map of the robot cleaner 100 with respect to a communication signal strength for each of the one or more external devices 400.

The learning processor 130 may receive the communication signal strengths of the at least one or more external devices 400 as input data, generate a training data set by selecting the location information on the SLAM map of the robot cleaner as correct answer data, and train a location determination model based on the generated training data (S903).

For example, the learning processor 130 may label the location information on the SLAM map of the robot cleaner 100, which is the correct answer data for each of the strengths of the communication signals $W_1$, $W_2$, $W_3$, $W_4$, $W_5$, $W_6$ and $W_7$ to generate the training data, and train the location determination model based on the generated training data. Accordingly, the trained location determination model may output predetermined location information when a predetermined communication signal strength is input.

The location determination model may be an artificial neural network (ANN) model used in machine learning. The location determination model may consist of artificial neurons (nodes) that constitute a network by synapse binding. The location determination model may be defined by coupling patterns between neurons of other layers, a learning process of updating model parameters, and an activation function of generating an output value.

The location determination model may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

The location determination model may be generated through supervised learning. In detail, the training data used for training the location determination model may be labeled with location information on the SLAM map of the robot cleaner 100, and the location determination model may be trained using the labeled training data.

For example, when the location determination model is generated through supervised learning, the location determination model may be trained in a state where a label for the training data is given. The label may mean a correct answer (or result value) that the artificial neural network should infer when the training data is input to the artificial neural network.

The training data may include communication strength information with at least one or more external devices and location information on the SLAM map.

The location determination model may be trained to accurately infer the labeled location information from the given communication strength information.

The loss function (cost function) of the location determination model may be expressed as a square mean of a difference between a label for location information corresponding to each training data and location information inferred from each training data.

In addition, the model parameters of the location determination model included in the artificial neural network may be determined to minimize the cost function through learning.

That is, the location determination model may be an artificial neural network model on which supervised learning has been performed using training data including training communication signal strength data and their corresponding labeled location information.

When an input feature vector is extracted from the training communication signal strength data and is then inputted, a result for the location information according to the communication signal strength is output as the feature vector, and the location determination model may be trained to minimize the loss function corresponding the difference between an output target feature vector and labeled position information.

The learning processor 130 may set a label specifying location information according to the communication signal strength. For example, the locations of the cleaner may be labeled and set according to the strengths of communication signals with a plurality of external devices.

Figure 11:
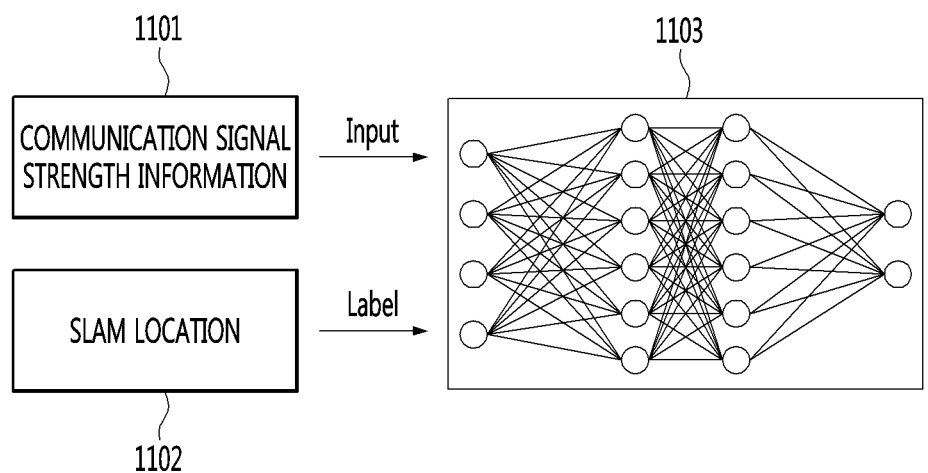

Referring to FIG. 11, the learning processor 130 may receive information 1101 about the strengths of communication signals with at least one or more external devices 400 as input data, and label correct answer data for location information inferred from the communication signal strengths with the location information 1102 on the SLAM map of the cleaner 100, to train the location determination model 1103 so as to infer the location of the cleaner from the communication signal strength information. Therefore, when new communication signal strength information is input, the location determination model may output location information determined according to a corresponding communication signal strength.

The communication unit 110 may transmit the trained position determination model to the external cleaner 300 (S904).

The external cleaner 300 may provide the location determination model that has received the communication signal strength information with the at least one or more external devices 400, and obtain the location information of the external cleaner 300 output from the location determination model.

Figure 12:
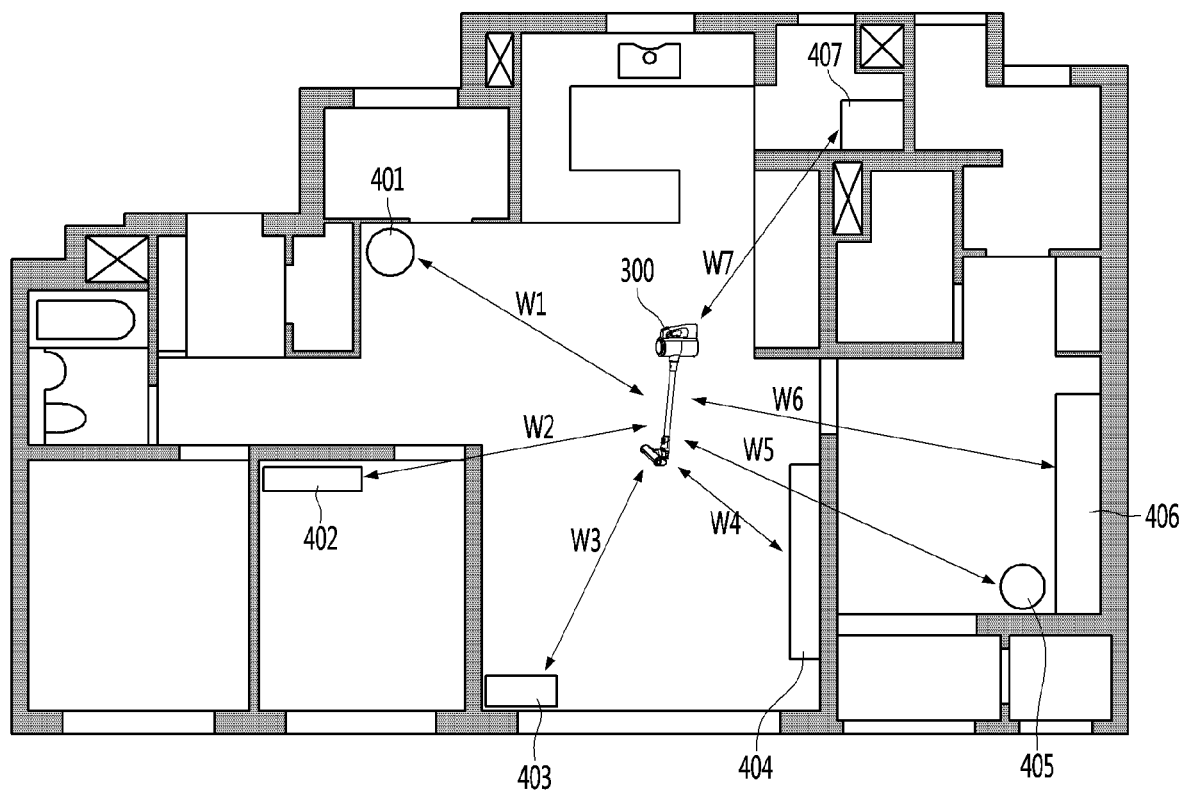
FIGS. 12 and 13 are diagrams for describing a process of acquiring location information using a location determination model according to an embodiment of the present disclosure.

Referring to FIG. 12, the external cleaner 300 may obtain information about the strengths of communication signals $W_1$, $W_2$, $W_3$, $W_4$, $W_5$, $W_6$ and $W_7$ between the robot cleaner 300 and a first external device 401, a second external device 402, a third external device 403, a fourth external device 404, a fifth external device 405, a sixth external device 406, and a seventh external device 407.

Figure 13:
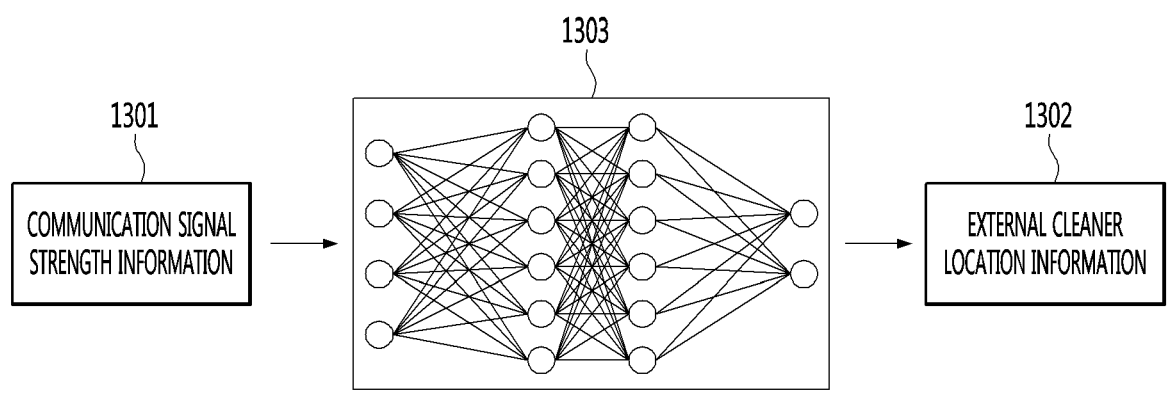

Referring to FIG. 13, the external cleaner 300 may provide the location determination model 1303 with information about obtained strengths of the communication signals $W_1$, $W_2$, $W_3$, $W_4$, $W_5$, $W_6$ and $W_7$ as input data and obtain the location information 1302 of the external cleaner 300 inferred from the input data. Accordingly, the external cleaner 300 may obtain the location information using information about the strength of the communication signal with the surrounding external devices without using the SLAM.

In addition, when the robot cleaner 100 and the external cleaner 300 clean the same space in which the same external devices 400 are disposed, the accuracy of the location information output from the location determination model may be improved.

The external cleaner 300 may store location information output from the location determination model. The location information of the external cleaner 300 may have the same format as the location information on an SLAM map of the robot cleaner 100.

The external cleaner 300 may generate and store first cleaning record information including cleaning path information recorded based on the location information, and transmit the generated first cleaning record information to the robot cleaner 100.

The robot cleaner 100 may store second cleaning record information including cleaning path information generated based on location information on the SLAM map for a cleaning space.

The memory 170 may store the second cleaning record information including cleaning path information generated based on the location information of the robot cleaner 100 (S802).

The location information of the robot cleaner 100 may be location information of the robot cleaner 100 on a simultaneous localization and mapping (SLAM) map for the cleaning space.

The memory 170 may store an SLAM map created through a simultaneous localization and mapping (SLAM) map algorithm.

When coordinates in the cleaning space are set through the SLAM map for the cleaning space, the processor 180 may store the coordinates in the cleaning space where the robot cleaner 100 is located in the memory 170 as location information.

The second cleaning record information may include coordinate information in the SLAM map for the cleaning space. The cleaning record information may include cleaning path information generated based on coordinate information in the SLAM map of the robot cleaner 100.

The second cleaning record information may include information about at least one of a cleaning date and time, a cleaning degree, and a cleaning mode of the robot cleaner 100. The second cleaning record information may include information about a cleaning start date and time and a cleaning end date and time for each cleaning each time the robot cleaner 100 performs the cleaning. The second cleaning record information may include information about the cleaning degree such as a vacuum suction strength at which the robot cleaner 100 sucks dust, a rotation speed of a motor, and the like. The second cleaning record information may include information about the cleaning mode of the robot cleaner 300. For example, the cleaning mode may include a normal cleaning mode, a simple cleaning mode, a non-cleaning mode, and a intensive cleaning mode (or a meticulous cleaning mode). In addition, the cleaning mode may include a dust suction mode, a carpet mode and a wet mopping mode. The second cleaning record information may include information about a cleaning mode in which the robot cleaner 100 has performed cleaning at a predetermined location and at a predetermined date and time.

The processor 180 may generate a cleaning plan based on the first cleaning record information and the second cleaning record information (S803).

The processor 180 may determine a cleaned area on which the external cleaner 300 has performed cleaning and an uncleaned area on which the external cleaner 300 have not performed cleaning, based on the first cleaning record information.

The processor 180 may determine an area which is on the cleaning path of the external cleaner 300 as the cleaned area, and an area which is out of the cleaning path as the uncleaned area based on the cleaning path information of the external cleaner 300 included in the first cleaning record information.

The processor 180 may generate a cleaning plan for the uncleaned area that the external cleaner 300 have not performed cleaning. Also, when it is determined based on the second cleaning record information that the uncleaned area on which the external cleaner 300 have not performed cleaning is cleaned by the robot cleaner 100 within a predetermined time period, the processor 180 may generate a cleaning plan that excludes cleaning of uncleaned areas on which the external cleaner 300 have not performed.

Therefore, the robot cleaner 100 may perform efficient cleaning by cleaning an area on which a user have not performed cleaning using the external cleaner 300.

In addition, the processor 180 may generate a cleaning plan to perform cleaning at a date and time when the external cleaner 300 is to not perform cleaning, based on the first cleaning record information.

The processor 180 may generate a cleaning plan to perform cleaning on the current date when it is determined that the external cleaner 300 is to not perform cleaning on the current date, based on the information about the cleaning date and time of the external cleaner 300 included in the first cleaning record information. In addition, when it is determined that the external cleaner 300 and the robot cleaner 100 are to not perform cleaning on the current date, based on the second cleaning record information. the processor 180 may generate a cleaning plan to perform cleaning on the current date. Therefore, the robot cleaner 100 may perform cleaning by cleaning on the date on which a user is to perform cleaning using the external cleaner 300.

In addition, the processor 180 may obtain cleaning pattern information based on the information about the cleaning path, the cleaning degree, and the cleaning mode of the external cleaner 300, and generate a cleaning plan according to the cleaning pattern of the external cleaner 300.

The cleaning pattern information may include information about a cleaning path of the external cleaner 300, a cleaning degree for each location of the external cleaner 300, and a cleaning mode for each location.

The processor 180 may generate a cleaning plan according to the cleaning pattern of the external cleaner 180.

Therefore, the robot cleaner 100 may perform cleaning at a cleaning degree for each position and in a cleaning mode for each position of the external cleaner 300 while traveling along the cleaning path of the external cleaner 300.

The processor 180 may determine whether the external cleaner 300 has performed cleaning within a preset time period with respect to a cleaning area on a path cleaned by the robot cleaner 100 based on the first cleaning record information and the second cleaning record information.

When the processor 180 determines that the external cleaner 300 has performed cleaning within a preset time period, the processor 180 may determine an area on which cleaning has performed twice or more as an incomplete cleaning area.

That is, the processor 180 may determine whether the external cleaner 300 has again cleaned an area, which has been cleaned by the robot cleaner 100, within a predetermined time period, and determine the area which cleaning has been performed twice or more as an incomplete cleaning area which the robot cleaner 100 has cleaned incompletely.

The processor 180 may generate a cleaning plan to perform cleaning on the incomplete cleaning area in a cleaning mode with a high cleaning degree. Therefore, when the user again cleans an area dissatisfied with a cleaning state resulted by the robot cleaner 100 using the external cleaner 300, the robot cleaner 100 may perform cleaning on the incomplete cleaning area with an high cleaning degree.

The cleaning mode with a high cleaning degree may mean a cleaning mode with a higher cleaning degree by increasing a dust suction force, a motor operating speed, or a cleaning performance time compared to a cleaning mode previously performed on the incomplete cleaning area.

For example, when there is a record indicating that cleaning has performed on an incomplete cleaning area in a normal cleaning mode, it is possible to generate a cleaning plan to perform cleaning on the incomplete cleaning area in a stronger cleaning mode (or a meticulous cleaning mode) with a higher cleaning degree. Further, when there is a record indicating that cleaning has performed on an incomplete cleaning area in a simple cleaning mode, it is possible to generate a cleaning plan to perform cleaning on the incomplete cleaning area in a normal cleaning mode with a higher cleaning degree.

The cleaning plan may include information about a cleaning target area, priority settings for cleaning areas, a planned cleaning path for travel, a cleaning date and time, a cleaning degree, a cleaning mode, and the like.

The processor 180 may control the robot cleaner 100 based on the generated cleaning plan (S804).

The processor 180 may perform cleaning by controlling the driving unit 160 and the cleaning unit 190 based on the generated cleaning plan.

The processor 180 may control a driving motor so as to travel according to the generated cleaning plan.

Meanwhile, the communication unit 110 may transmit the second cleaning record information generated after the robot cleaner 110 is controlled according to the cleaning plan and cleaning is then completed, to the external cleaner 300.

The external cleaner 300 may output a notification for the area previously cleaned by the robot cleaner 100 based on the received second cleaning record information, and output a message guiding cleaning for an area which have not cleaned by the robot cleaner 100.

Figure 14:
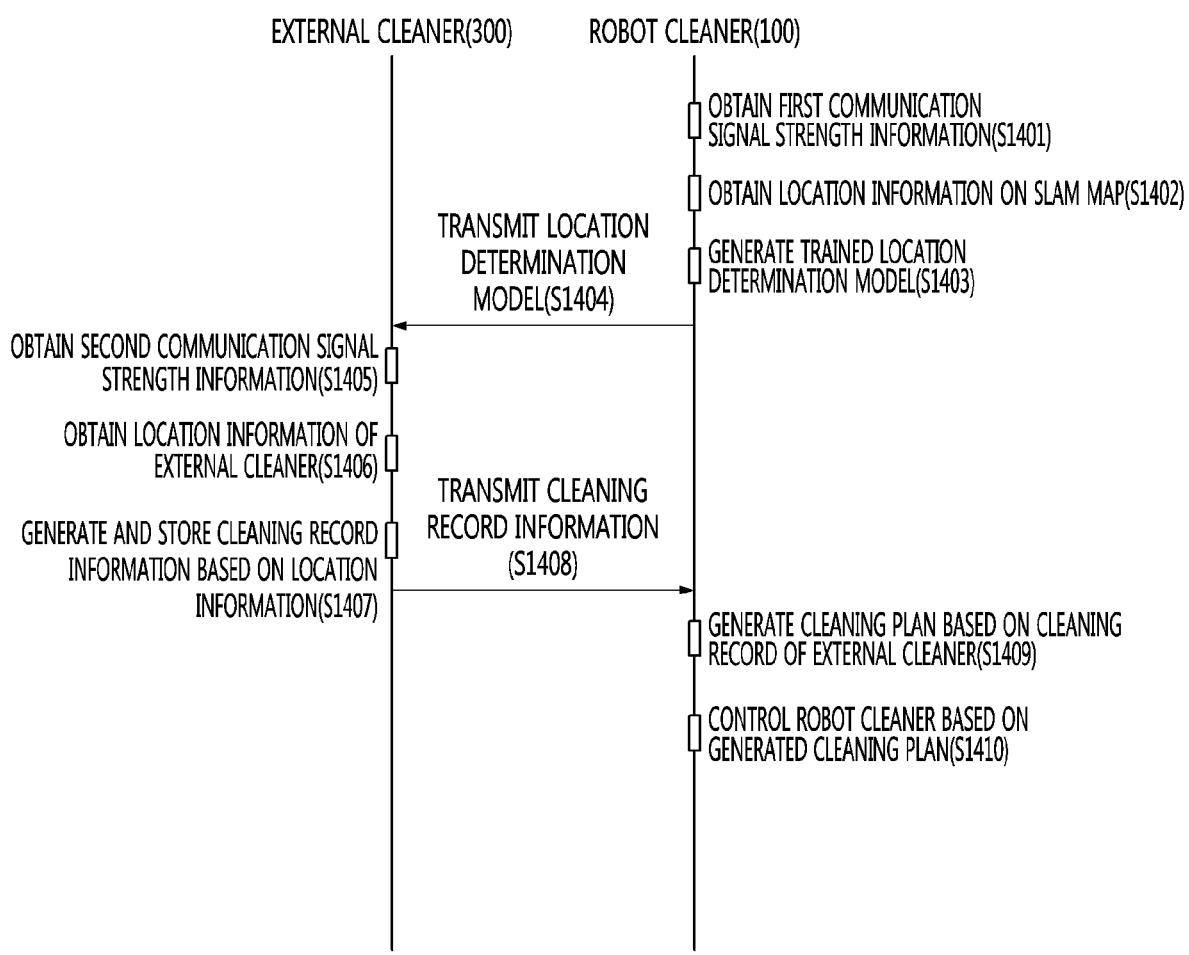
FIG. 14 is a flowchart for describing a cleaning method by an external cleaner and a robot cleaner according to an embodiment of the present disclosure.

FIG. 14 is a flowchart for describing a method of performing cleaning in an external cleaner and a robot cleaner according to an embodiment of the present disclosure.

The robot cleaner 100 may obtain first communication signal strength information with at least one or more external devices (S1401).

The robot cleaner 100 may obtain location information on the SLAM map (S1402).

The robot cleaner 100 may generate training data by labeling the first communication signal strength information with the location information on the SLAM map, and train the location determination model based on the generated training data (S1403).

The robot cleaner 100 may transmit the learned location determination model to the external cleaner 300 (S1404).

The external cleaner 300 may obtain second communication signal strength information with at least one or more external devices (S1405).

The external cleaner 300 may provide the location model with the second communication signal strength information as input data, and obtain the location information of the external cleaner 300 from the location determination model (S1406).

The external cleaner 300 may generate and store cleaning record information based on the obtained location information (S1407). The external cleaner 300 may transmit the cleaning record information to the robot cleaner 100.

The robot cleaner 100 may generate a cleaning plan based on the cleaning record of the external cleaner 300 (S1409). The robot cleaner 100 may clean based on the generated cleaning plan (S1410).

The present disclosure described above can be embodied as computer readable codes on a medium in which a program is recorded. The computer readable medium includes all kinds of recording devices in which data that are readable by a computer system is stored. Examples of computer readable medium include hard disk drives (HDDs), solid state disks (SSDs), silicon disk drives (SDDs), ROMs, RAMs, CD-ROMs, magnetic tapes, floppy disks, optical data storage devices, and the like. The computer may also include a processor 180 of the terminal.

According to the embodiments of the present disclosure, a cleaner operated by a user and a robot cleaner that travels by itself may share information about cleaning areas with each other, achieving efficient cleaning.

In addition, according to various embodiments of the present disclosure, it is possible to obtain the location information of the cleaner based on a neural network model capable of determining the location of the cleaner using information about the strength of a communication signal with an external device.

In addition, according to various embodiments of the present disclosure, the robot cleaner may efficiently perform cleaning by generating a cleaning plan based on the cleaning record information of the external cleaner.

In addition, according to various embodiments of the present disclosure, the cleaning record information of the robot cleaner may be transmitted to the external cleaner to enable the user to efficiently perform cleaning using the external cleaner.

The user may be guided for the optimal placement of at least one piece of furniture. Accordingly, when furniture is arranged in the room, it is possible to optimize the movement line in the room and to secure the gaze of the user.

What is claimed is:

1. A robot cleaner comprising:
a driving motor;
a communication interface configured to receive, from an external cleaner, first cleaning record information including cleaning path information generated based on location information of the external cleaner;
a memory configured to store second cleaning record information including the cleaning path information generated based on location information of the robot cleaner; and
a processor configured to generate a cleaning plan of the robot cleaner based on the first cleaning record information and the second cleaning record information and control the driving motor such that the driving motor travels according to the cleaning plan,
wherein the processor is configured to measure a communication signal strength for each of at least one or more external devices and obtain location information on a SLAM map for an operation space of the robot cleaner, and
wherein the robot cleaner further comprises a learning processor configured to train a location determination model for outputting predetermined location information when a predetermined communication signal strength is input based on training data labeled with the location information on the SLAM map with respect to the communication signal strength.

2. The robot cleaner of claim 1, wherein the processor is configured to transmit the trained location determination model through the communication interface.

3. The robot cleaner of claim 1, wherein the location information of the external cleaner is location information output from the trained location determination model by providing the communication signal strength between the external cleaner and the at least one or more external devices to the trained location determination model as input data.

4. The robot cleaner of claim 1, wherein the processor is configured to determine a cleaned area on which the external cleaner has performed cleaning and an uncleaned area on which the external cleaner does not perform cleaning based on the first cleaning record information and generate a cleaning plan for the uncleaned area on which cleaning is not performed.

5. The robot cleaner of claim 1, wherein the first cleaning record information further includes a cleaning date and time, a cleaning degree, and a cleaning mode of the external cleaner.

6. The robot cleaner of claim 5, wherein the processor is configured to generate a cleaning plan at a date and time when the external cleaner is to not perform cleaning.

7. The robot cleaner of claim 5, wherein the processor is configured to obtain cleaning pattern information based on information for the cleaning path, the cleaning degree and the cleaning mode of the external cleaner and generate a cleaning plan according to the cleaning pattern of the external cleaner.

8. The robot cleaner of claim 1, wherein the second cleaning record information further includes a cleaning date, a cleaning degree, and a cleaning mode of the robot cleaner, and
wherein the processor is configured to, when it is determined that the external cleaner has performed cleaning on a cleaning area on a path cleaned by the robot cleaner based on the first cleaning record information and the second cleaning record information within a preset time period, determine the cleaning area as an incomplete cleaning area, and generate a cleaning plan to perform cleaning on the incomplete cleaning area in a cleaning mode with a high cleaning degree.

9. The robot cleaner of claim 1, wherein the communication interface transmits, to the external cleaner, second cleaning record information generated when the driving motor is controlled such that the driving motor travels according to the cleaning plan and cleaning is then completed.

10. A cleaning method comprising:
receiving, from an external cleaner, first cleaning record information including cleaning path information generated based on location information of the external cleaner;
storing second cleaning record information including cleaning path information generated based on location information of the robot cleaner;
generating a cleaning plan of the robot cleaner based on the first cleaning record information and the second cleaning record information; and
controlling the driving motor such that the driving motor travels according to the cleaning plan,
measuring a communication signal strength for each of at least one or more external devices;
obtaining location information on an SLAM map for an operation space of the robot cleaner; and
training a location determination model for outputting predetermined location information when a predetermined communication signal strength is input based on training data labeled with the location information on the SLAM map with respect to the communication signal strength.

11. The method of claim 10, further comprising:
transmitting the trained location determination model to the external cleaner.

12. The method of claim 10, wherein the location information of the external cleaner is location information output from the trained location determination model by providing a strength of a communication signal between the external cleaner and the at least one or more external devices to the trained location determination model as input data.

13. The method of claim 10, wherein the generating of the cleaning plan includes
determining a cleaned area on which the external cleaner has performed cleaning and an uncleaned area on which the external cleaner does not perform cleaning based on the first cleaning record information, and
generating a cleaning plan for the uncleaned area on which cleaning is not performed.

14. The method of claim 10, wherein the first cleaning record information further includes a cleaning date and time, a cleaning degree, and a cleaning mode of the external cleaner.

15. The method of claim 14, wherein the generating of the cleaning plan includes generating a cleaning plan at a date and time when the external cleaner is to not perform cleaning.

16. The method of claim 14, wherein the generating of the cleaning plan includes
obtaining cleaning pattern information based on information for the cleaning path, the cleaning degree and the cleaning mode of the external cleaner; and
generating a cleaning plan according to the cleaning pattern of the external cleaner.

17. The method of claim 10, wherein the second cleaning record information further includes a cleaning date, a cleaning degree, and a cleaning mode of the robot cleaner, and
wherein the generating of the cleaning plan includes
determining that the external cleaner has performed cleaning on a cleaning area on a path cleaned by the robot cleaner based on the first cleaning record information and the second cleaning record information within a preset time period,
determining the cleaning area as an incomplete cleaning area, and
generating a cleaning plan indicating that the incomplete cleaning area is to be cleaned in a cleaning mode with a high cleaning degree.

18. The method of claim 10, further comprising:
transmitting, to the external cleaner, second cleaning record information generated when the driving motor is controlled such that the driving motor travels according to the cleaning plan and cleaning is then completed.

\* \* \* \* \*